United States Patent [19]

Milish

[11] Patent Number: 4,537,070

[45] Date of Patent: Aug. 27, 1985

[54] MAGNETICALLY RESPONSIVE CIRCUIT-ELEMENT MODULE FOR LIQUID-LEVEL MONITORING AND PROBE THEREFROM

[75] Inventor: William P. Milish, Bristol, Conn.

[73] Assignee: Transamerica Delaval Inc., Princeton, N.J.

[21] Appl. No.: 526,878

[22] Filed: Aug. 26, 1983

[51] Int. Cl.³ .................. G01F 23/12; H01H 35/18
[52] U.S. Cl. ........................ 73/313; 73/DIG. 5; 339/49 R; 361/404
[58] Field of Search ................. 73/313; 206/84 C; 361/406, 407; 339/47 R, 49 R; 307/118

[56] References Cited

U.S. PATENT DOCUMENTS

| | | | |
|---|---|---|---|
| 3,227,926 | 1/1966 | Parstorfer et al. | 361/406 X |
| 3,234,433 | 2/1966 | Braunagel | 361/392 |
| 3,281,627 | 10/1966 | Fetterolf et al. | 361/406 X |
| 3,334,274 | 8/1967 | Warman et al. | 361/392 |
| 3,340,436 | 9/1967 | Jones et al. | 361/392 |
| 3,445,728 | 5/1969 | Jorgensen et al. | 335/152 X |
| 3,523,273 | 8/1970 | Hammell et al. | 339/47 R X |
| 3,976,963 | 8/1976 | Küber | 73/313 |
| 4,284,904 | 8/1981 | Tetro | 307/118 |

*Primary Examiner*—Daniel M. Yasich
*Attorney, Agent, or Firm*—Hopgood, Calimafde, Kalil, Blaustein & Judlowe

[57] ABSTRACT

Components of a π-network of resistors and magnetically responsive reed switches are encapsulated to form modules with keyed ends for end-to-end interlocking assembly. Conductive tabs of one module mate with those of the next module to establish electrical connection therebetween. Keying polarizes the modules to prevent incorrect assembly. The modules can be made with $2^n$ switches where n is any positive number including zero. Probe assemblies of any length can be produced with the spacing interval between reed switches being uniform throughout the length of the probe.

20 Claims, 20 Drawing Figures

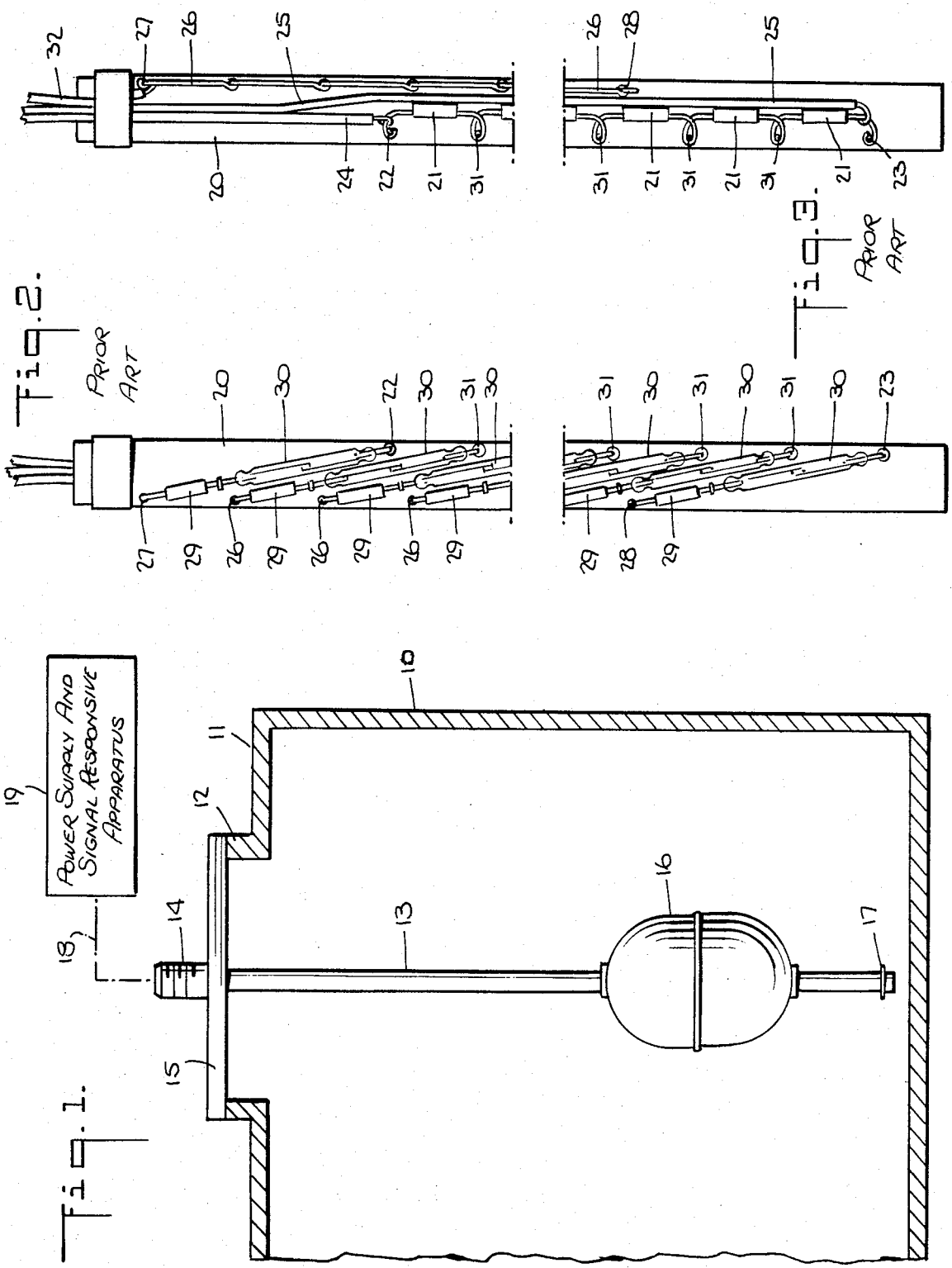

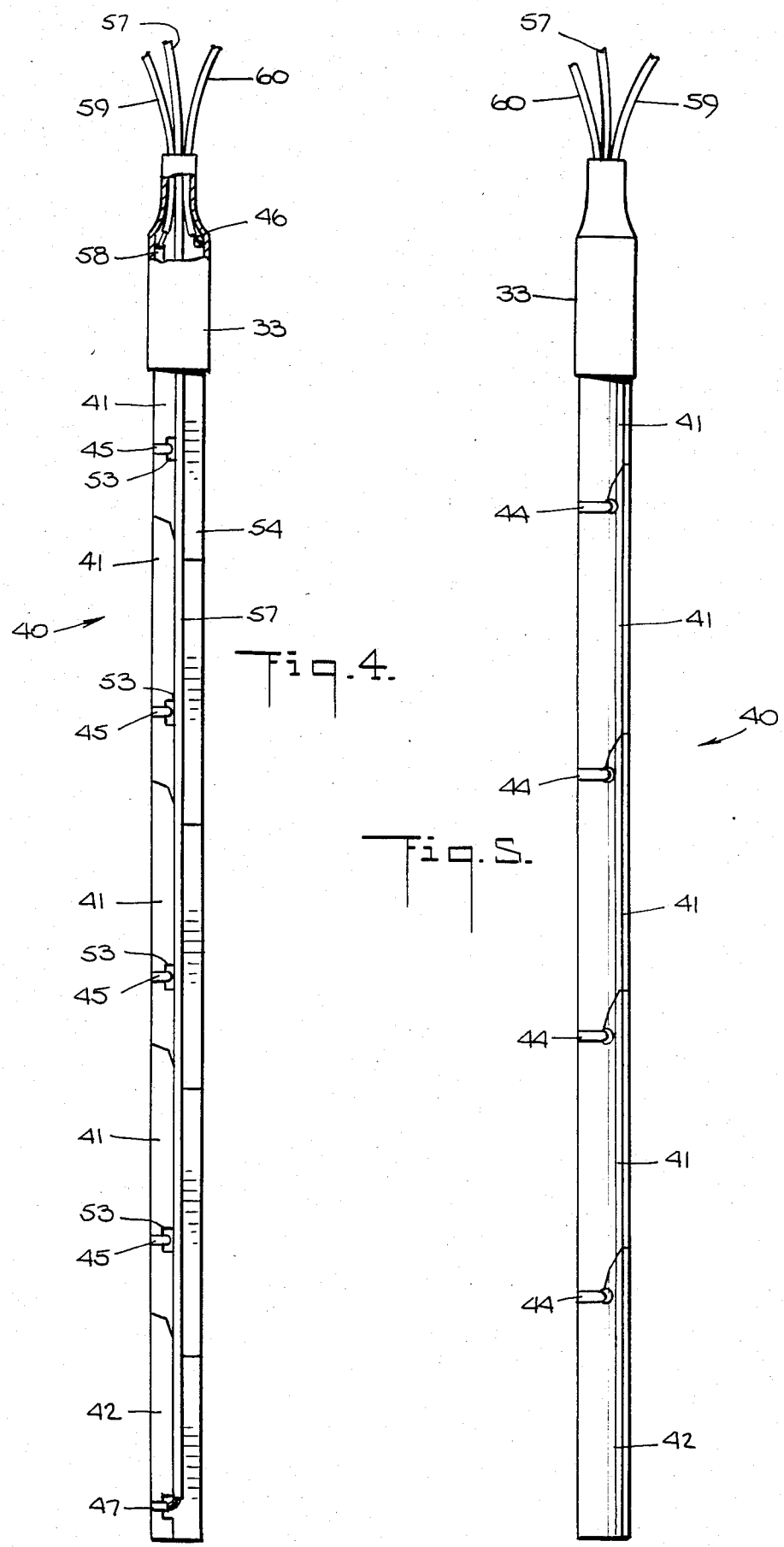

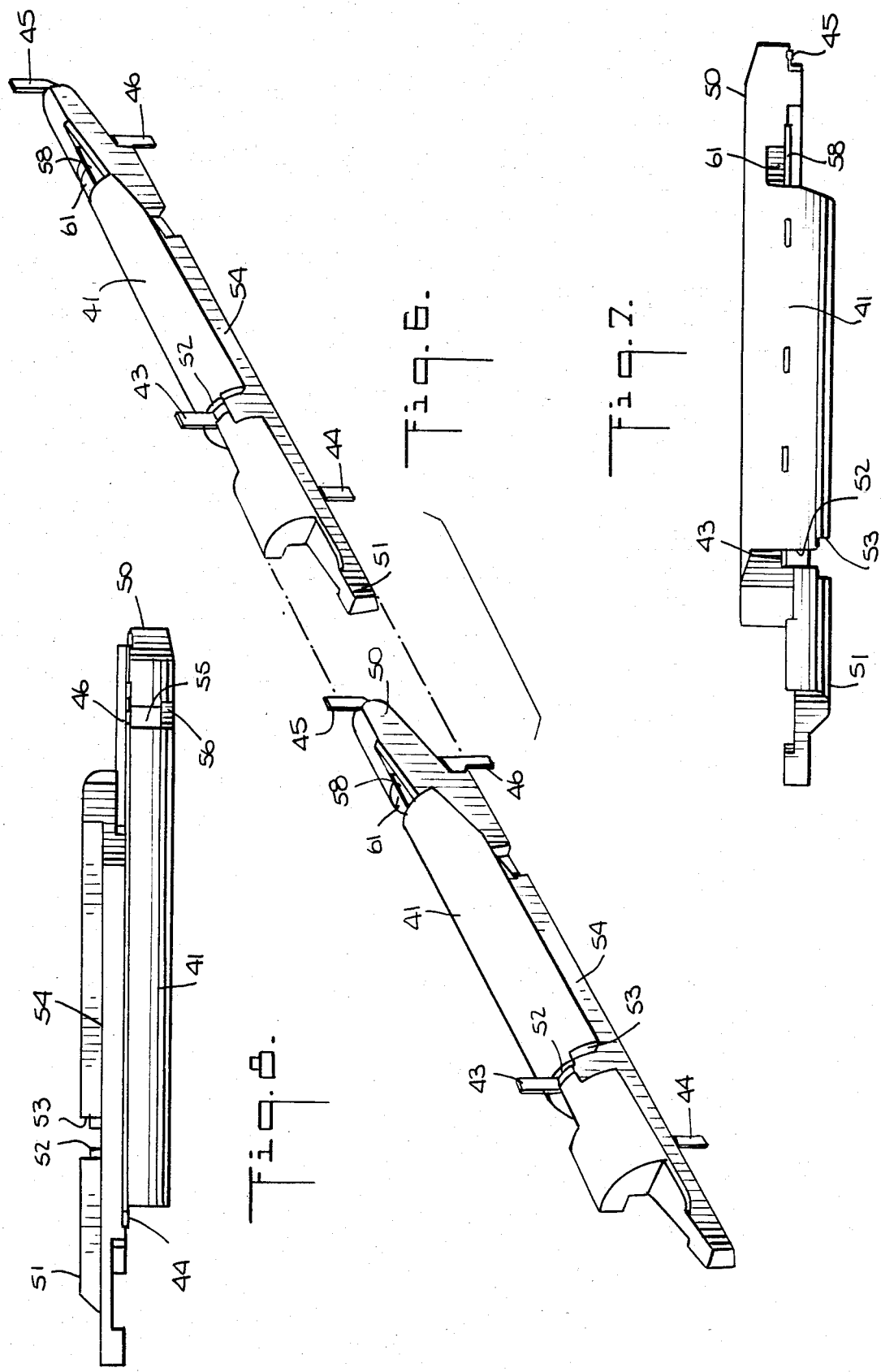

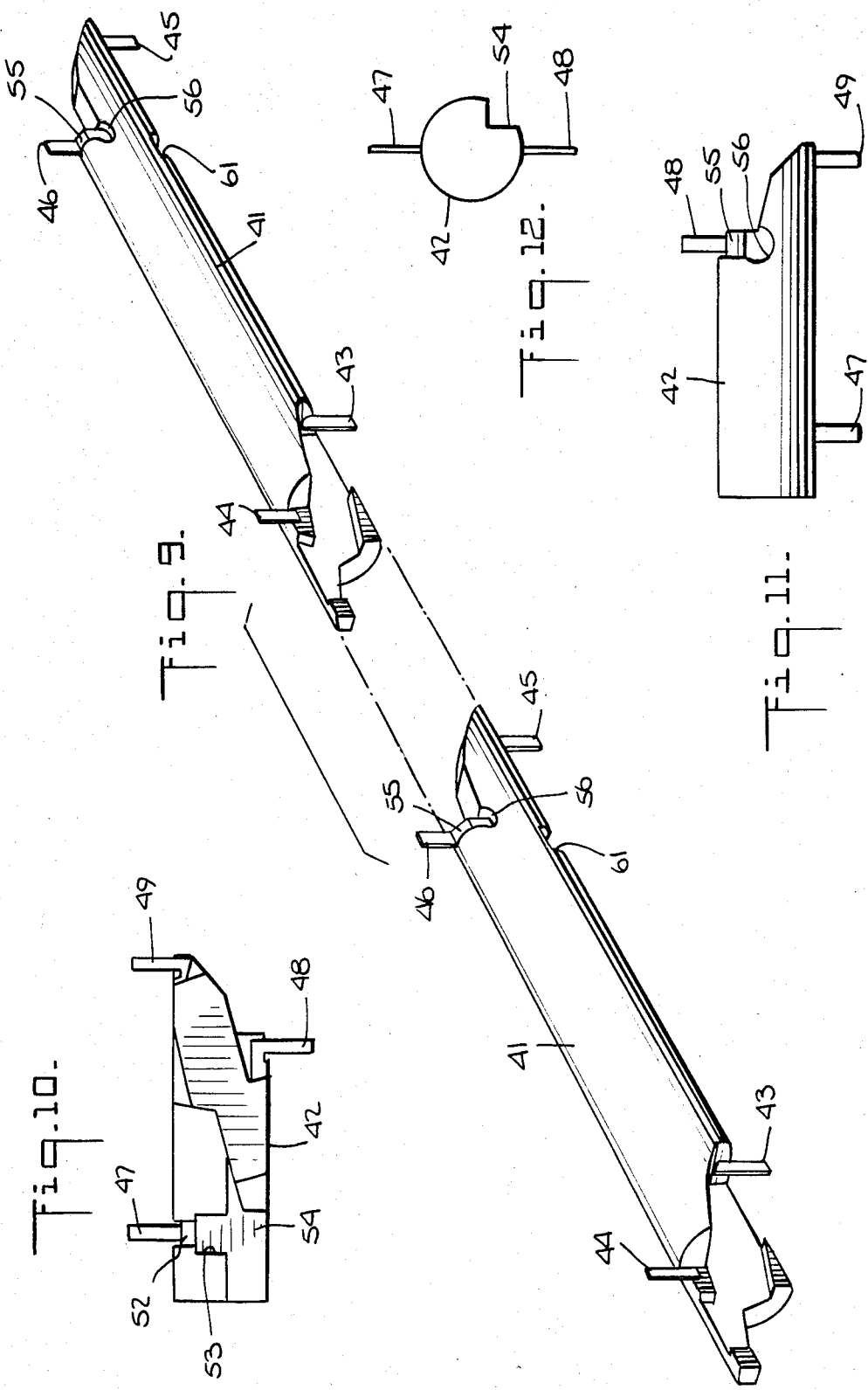

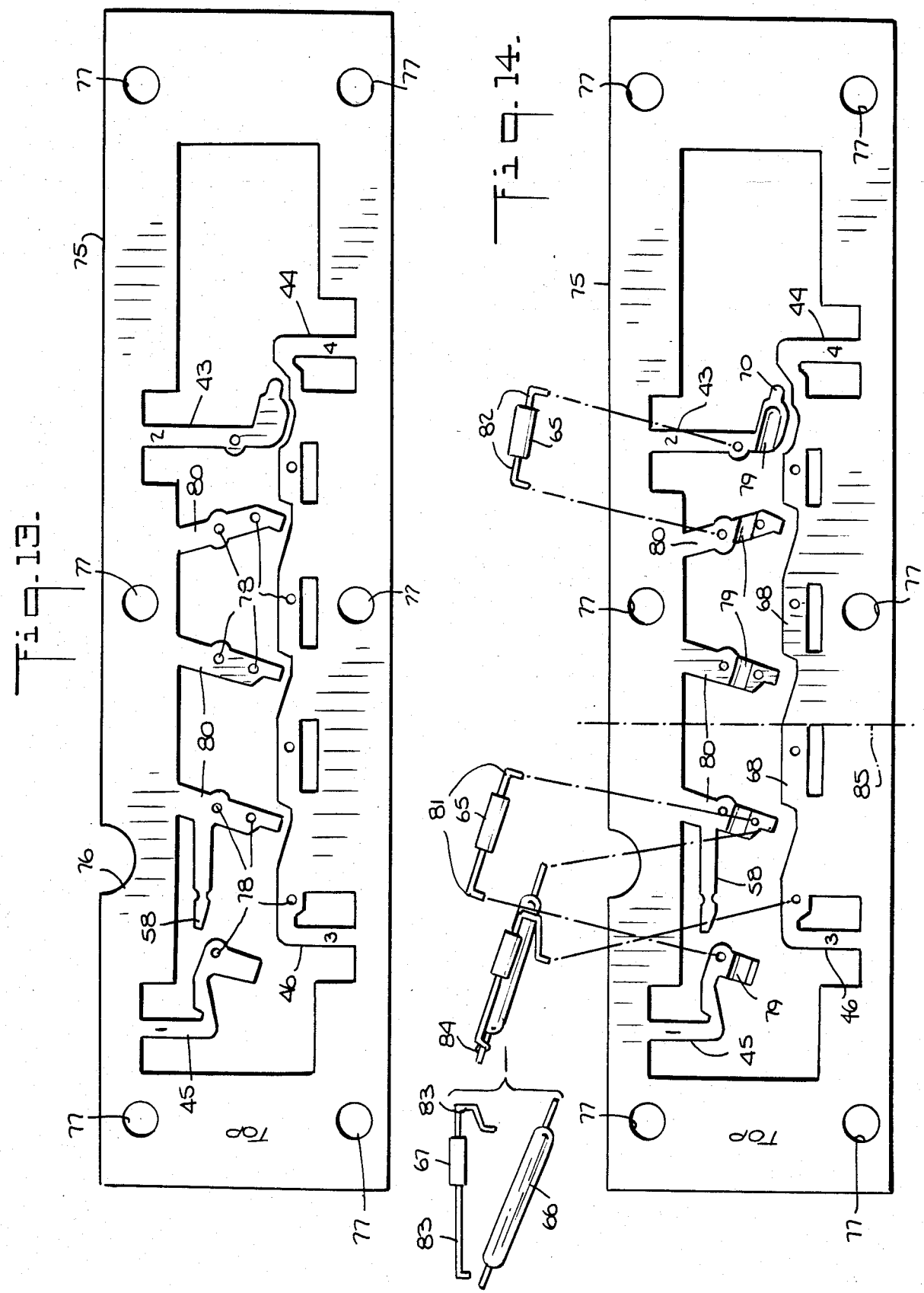

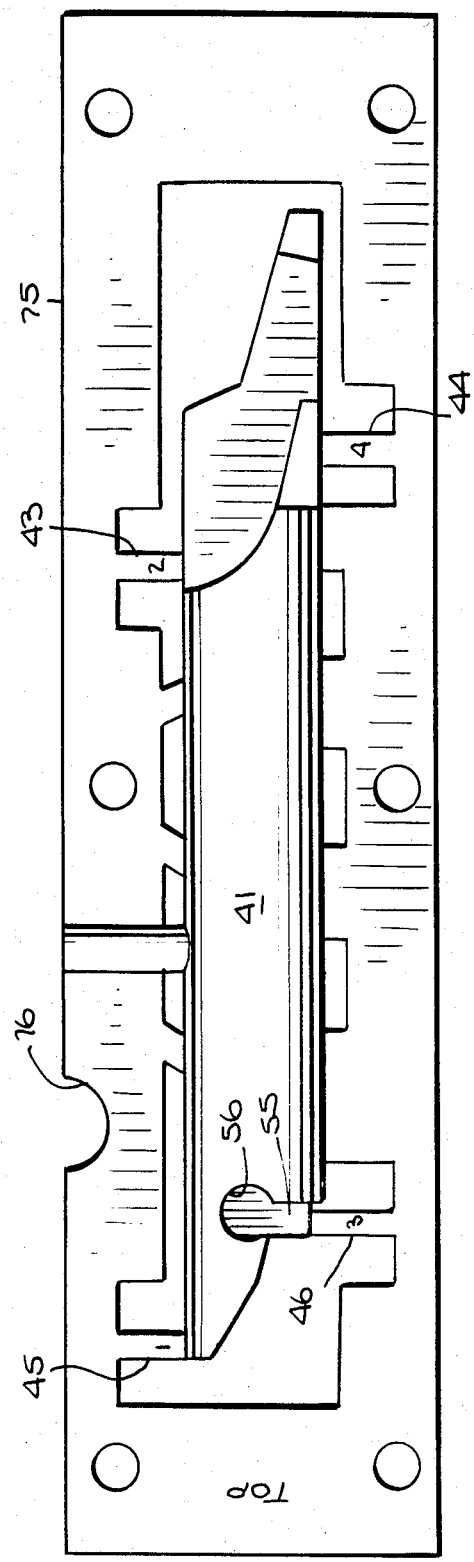
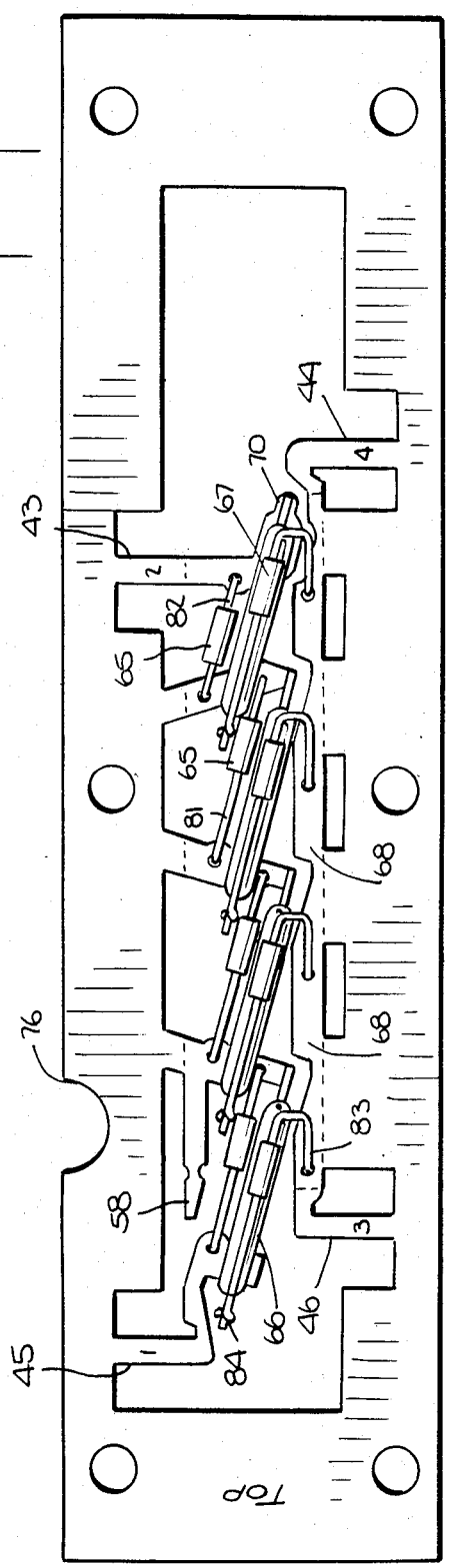

MAGNETICALLY RESPONSIVE CIRCUIT-ELEMENT MODULE FOR LIQUID-LEVEL MONITORING AND PROBE THEREFROM

BACKGROUND OF THE INVENTION

The present invention relates to liquid-level monitoring or measuring apparatus and, more particularly, to the transmitter unit for such apparatus.

Various apparatus are known for monitoring or measuring liquid level in a container or other confined space. One such apparatus employs a series-connected array of resistors whose inter-resistor junctions are tapped through individual magnetically actuatable glass enclosed reed switches to a common bus to form a series of $\pi$ networks. The reed switches are closed in sequence in response to tracking of the liquid level by a float borne permanent magnet. The electrical effect is akin to adjusting the slider on a resistance potentiometer whereby a suitable meter can respond to a signal for indicating liquid level or the like.

An example of such prior apparatus is described and claimed in U.S. Pat. No. 4,284,904 of Roland G. Tetro, issued Aug. 18, 1981, and assigned to the same assignee as the present application. As described in said patent, each network consisting of two resistors and one reed switch is separately encapsulated to provide a circuit element of unit length. Each encapsulated network has projecting terminal-strip elements by which the network is secured to a base strip or carrier of fiber-glass-filled plastic. The networks are connected via their projecting terminal-strip elements in tandem to form an array of any desired length. However, since the networks are connected end-to-end and are of unit length, the resolution sensitivity of this apparatus as limited to the dimension of the unit of length.

The array of reed switches such as that described in the aforementioned patent will be referred to herein as the "transmitter" of the apparatus, and the transmitter is normally inserted into a housing of some form to isolate it from the fluids being monitored. At the same time the housing provides a guide for the float element.

Another form of transmitter is known in which the resistors and glass enveloped reed switches are mounted directly on a strip of fiberglass reinforced plastic. In this latter version of the transmitter the reed switches are accurately mounted in a vertical echelon-like pattern such that as the magnet-carrying float rises or falls with the liquid level more than one switch is closed at any one instant. As will be explained later in the detailed description, this known arrangement is capable of providing increased resolution sensitivity. For example, if when the transmitter is vertically positioned the uniform inter-switch spacing is such as to position the reed switches at $\frac{1}{2}$" intervals from the bottom to the top, and if the float as it moves closes switches in a 2-3-2 pattern, the transmitter will have a resolution sensitivity of $\frac{1}{4}$".

The echelon type transmitter has been produced in a size that fits within a tubular housing having an inside diameter of about $\frac{3}{8}$". Unfortunately, this type of construction has a length limitation determined by the maximum length of carrier substrate that can be obtained. At present, it appears that there is a 60" limit on the size available from the manufacturers of such substrate material.

It is, therefore, an object of the present invention to provide a replacement for the echelon type transmitter sized to fit within a $\frac{3}{8}$" I.D. housing, which is free of any length restraint within practical limits.

It is a further object of the invention to provide such replacement in modular form and with the same liquid-level resolution capability as the previously known transmitter.

SUMMARY OF THE INVENTION

In accordance with the invention there is provided a magnetically responsive circuit-element module for liquid-level monitoring apparatus comprising an elongated body having ends that are complementally shaped and keyed for interlocking end-to-end assembly with other modules having the same end construction to form an assembly of any desired length, at least one magnetically responsive reed switch confined within said body, and electrically conductive members accessible from without said body and extending into the interior of said body for establishing electrical connection to said reed switch, said conductive members being disposed with respect to said body such that upon effecting said interlocking assembly with other modules said conductive members are positioned for coupling to complemental conductive members extending into said other modules to establish a parallel-connected network of reed switches.

BRIEF DESCRIPTION OF THE DRAWINGS

The invention will be better understood after reading the following detailed description of the presently preferred embodiments thereof with reference to the appended drawings in which:

FIG. 1 is a simplified vertical sectional view of a tank provided with a liquid-tight housing and magnet carrying float which when supplied with a transmitter in the form of an array of magnetically operable switch units provides apparatus for providing liquid-level measuring signals;

FIG. 2 is a fragmentary front elevational view of a prior art transmitter assembly containing an array of magnetically responsive reed switches and resistors mounted on a strip of fiberglass reinforced plastic material;

FIG. 3 is a fragmentary rear elevational view of the transmitter of FIG. 2;

FIG. 4 is an elevational view of a transmitter formed from a plurality of interlockable and electrically interconnectable modules constructed and assembled in accordance with the present invention and providing a direct substitution for the prior art transmitter of FIG. 2 in the housing of the liquid-level measuring apparatus of FIG. 1, the transmitter being seen from the side revealing the groove for accommodating the hard wire connection to the bottom end of the transmitter;

FIG. 5 is an elevational view of the transmitter of FIG. 4 as seen from the rear;

FIG. 6 is an exploded perspective view of a plurality of the modules of the transmitter of FIG. 4 prior to assembly and as seen generally from the same side as in FIG. 4;

FIGS. 7 and 8 are top and bottom plan views, respectively, of the modules of FIG. 6;

FIG. 9 is a view of the modules of FIG. 6 as seen from the opposite side;

FIGS. 10 and 11 are views corresponding, respectively, to FIGS. 6 and 9, showing a bottom module before assembly to the modules of FIGS. 6 to 9;

FIG. 12 is a bottom end view of the module of FIG. 10;

FIGS. 13 to 16 are similar plan views, FIG. 14 also being an exploded view, to illustrate stages in a manufacturing procedure for fabricating the individual modules of FIGS. 6 to 9;

The same reference numerals are used throughout the drawings to designate the same or similar parts.

DETAILED DESCRIPTION OF THE PREFERRED EMBODIMENTS

Figure 17:
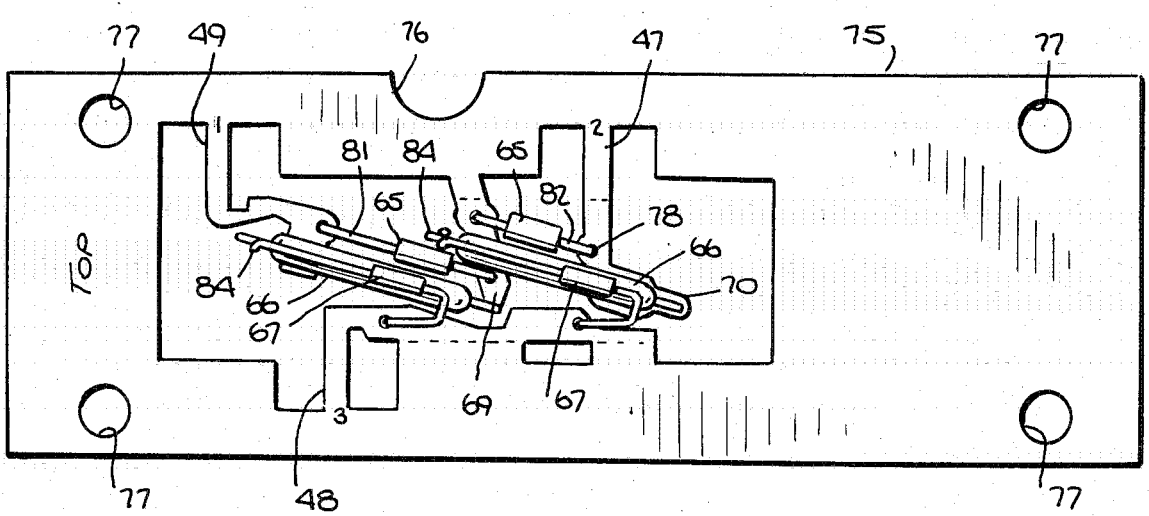
FIGS. 17 and 18 are views corresponding, respectively, to FIGS. 15 and 16, but showing the modification in the manufacturing procedure for producing the bottom module of FIGS. 10, 11 and 12.

Referring to FIG. 1 there is a simplified fragmentary vertical sectional view of a typical installation for a liquid-level monitoring or measuring transmitter of the type contemplated by the present invention. As shown, the installation may consist of a tank 10 whose upper wall 11 is provided with a flanged access port 12. A metal tubular housing 13 in the form of a vertical section of pipe, provided with a threaded end 14, is mounted within the tank and secured to the flanged port 12 by a mounting flange 15. A float 16 having a central bore is positioned to ride up and down along the length of the housing 13 limited in its upward movement by the flange 15 and in its downward movement by a stop ring 17 secured to the lower end of housing 13, as shown.

The transmitter unit is insertable within the housing 13 from the upper end thereof and is connected by suitable leads represented by the broken line 18 to the power supply and signal responsive apparatus 19. Various other mounting arrangements for the housing 13 can be utilized in place of the flange 15, as desired. In addition, the float configuration and material can be altered in known manner.

Turning attention now to FIGS. 2 and 3, there is shown the front and back of the known transmitter in which the electrical components are secured directly to an elongated strip of insulating material 20, preferably of fiberglass reinforced plastic. A series of resistors 21 are connected in series between a terminal 22 at the upper end and a bottom terminal 23 to form a voltage divider in known manner. Leads 24 and 25 connected, respectively, to terminals 22 and 23 provide means for applying a voltage across the voltage divider. A conductive bus 26 is established between terminals 27 and 28 to which is connected one terminal of each of the resistors 29. The opposite terminals of the resistors 29 are connected, respectively, to an individual reed switch 30 and through the switch to the corresponding junctions 31 between adjacent resistors 21 or to the end terminals 22 or 23, as shown. A further lead 32 provides the final connection to the terminal 27 for providing an output connection from the bus 26.

A consideration of the structure just described with reference to FIGS. 2 and 3 reveals a circuit network wherein the magnetic reed switches are tapped into a voltage divider. If, for the sake of discussion, the connections between the individual resistors 21 are precisely $\frac{1}{2}''$ apart over the length of the transmitter, the tapping of the voltage divider by the reed switches will be at $\frac{1}{4}''$ intervals. Consequently, as the magnet-equipped float closes the reed switches 30 in a 2-3-2 pattern as the float moves in a given direction, the effect will be as follows. When two switches are closed the effective tap point on the voltage divider will be halfway between the connection points of the two closed switches. When three switches are closed the tap point will correspond to the connecting point of the middle switch. Therefore, if a voltmeter is connected between the bus 26 and the lead 25, the voltage read by the meter will change incrementally for each $\frac{1}{4}''$ of float travel.

Reference should now be had to FIGS. 4 and 5 illustrating a transmitter constructed in accordance with the present invention. The transmitter is in the form of a probe designated generally by the reference numeral 40 formed from a plurality of individual modules, the bottom module being designated by the numeral 42 and the rest of the modules by the numeral 41. The modules are joined end-to-end both mechanically and electrically to provide a continuous network of uniformly spaced magnetically responsive reed switches throughout the length of the probe, the details of which will be described hereinafter. As with the prior art embodiment described with reference to FIGS. 2 and 3, the reed switches are housed within the probe structure 40 in the same echelon-like array and with the exact same spacing such that the probe 40 is physically and functionally interchangeable with the transmitter illustrated in FIGS. 2 and 3. Each of the modules 41 and 42 comprises an elongated body having ends complementally shaped and keyed in interlocking end-to-end assembly with the adjacent modules. Obviously, the bottom module 42 is so connected at only one end.

All of the modules 41 are identical in construction and are shown in FIGS. 6 to 9 prior to assembly to one another. As seen in FIGS. 6 to 9 the modules have electrically conductive members or tabs 43, 44, 45 and 46 extending from without, i.e., outside, the body into the interior thereof. In similar manner, the module 42 (see FIGS. 10 and 11) has external conductive members or tabs 47, 48 and 49 that extend into the body.

Referring to FIG. 6, for example, when the end 50 of the lefthand module 41 is brought into complete interlocking engagement with the end 51 of the next module 41 on the right as seen in FIG. 6, the conductive tabs 45 and 46 of the lefthand module will underly the tabs 43 and 44 of the righthand module in substantially precise juxtaposition. Referring specifically to FIGS. 6 to 8 it will be seen that the body of the module 41 is provided, with a notch or groove 52 aligned circumferentially with the tab 43 which is here shown projecting radially from the body 41. The groove 52 opens into an enlarged recess or pocket 53 which, in turn, opens on a longitudinal rabbet or groove 54 running the length of the module.

The individual modules 41 and 42 are formed from a thermosetting plastic and when interlockingly interconnected are assembled with a suitable adhesive or bonding agent therebetween to complete the mechanical interconnection. As mentioned above, the conductive members or tabs 45 and 46 will lie in juxtaposition to the tabs 43 and 44. The tabs 43 and 45 can be bent collectively circumferentially to fall within the channel or groove 52 and pocket 53 and can then be soldered with the pocket 53 accommodating the solder material.

In similar fashion, as seen in FIG. 9, the body 41 is provided with a groove or channel 55 and pocket 56 for accommodating the tabs 44 and 46 to provide the soldered interconnection thereof.

Referring now back to FIGS. 4 and 5 the assembled probe can be observed with the various soldered conductive members electrically interconnecting the modules. As particularly shown in FIG. 4, the channel 54 provided by the rabbeted groove in each of the modules accommodates a connecting wire 57 connected by soldering to the tab 47 projecting from the bottom module 42. While the bottom module 42 is slightly different from the module 41, the grooves and pockets for accommoding the conductive tabs and the rabbet for accommodating the wire 57 are substantially the same and bear the same reference numerals.

While all of the modules 41 are identical, only the uppermost module of the probe shown in FIGS. 4 and 5 makes use of a connecting point or terminal 58 to which is connected a lead 59. The tab or conductive member 45 on the upper module 41 is not used and may be removed. One further connection by way of lead 60 is effected to the tab 46 of the upper module which tab can be circumferentially bent to lie within the groove 55 with the solder connection with lead 60 being accommodated in the pocket 56. Alternatively the tab 46 and connection can be bent in the opposite direction as shown in FIG. 4. The purpose of connecting lead 59 to terminal 58 will be explained below. As best seen in FIG. 7, the body 41 is provided with another pocket 61 for accommodating the solder used to effect the connection to tab 58. The component 33 is a sleeve of insulating material.

It will be understood that the diameter of the probe 40 as shown in FIGS. 4 and 5 is approximately $\frac{3}{8}''$ permitting it to be installed in the same housing as the transmitter previously described with reference to FIGS. 2 and 3. All of the electrically connecting terminals or tabs between the modules are accommodated within recesses so as to avoid any projections or protuberances that would interfere with insertion in the housing such as the housing 13 in FIG. 1.

Figure 20:
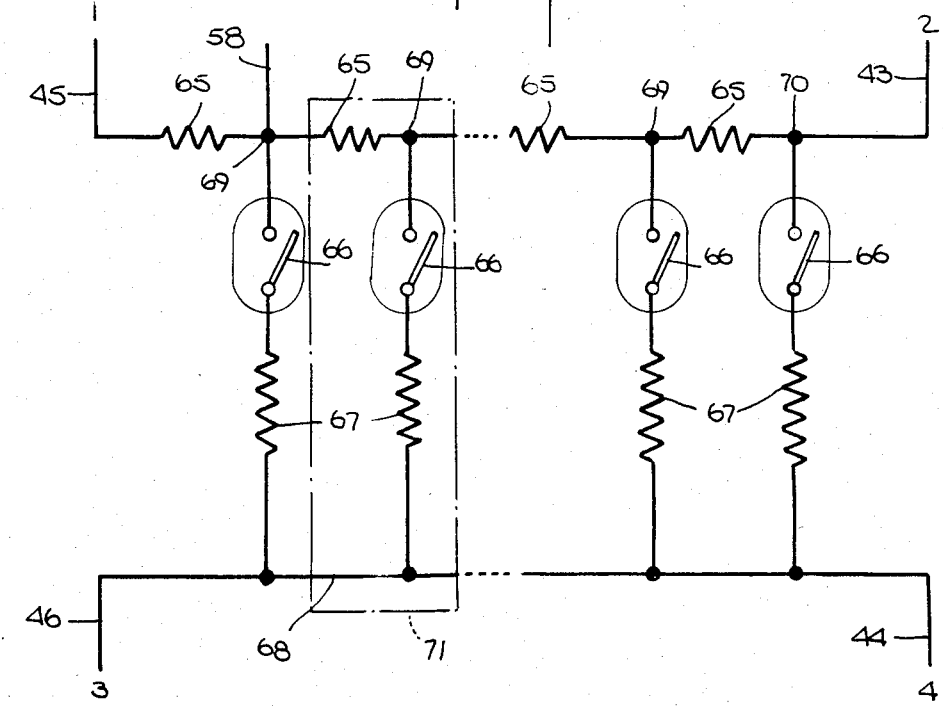
FIG. 20 is a schematic circuit diagram for describing the circuits embodied in the various modules.

Before proceeding with a description of a presently preferred method of fabricating the modules 41 and 42, it may be helpful to consider the circuit produced by assembling the modules which circuit is illustrated in FIG. 20. As shown therein the terminals or tabs 43 and 45 are connected through a series arrangement of resistors 65. The magnetically actuatable reed switches are designated by the reference numeral 66, each of which is connected in series with a separate resistor 67. A conductive bus 68 interconnects the conductive members or tabs 44 and 46. One end of each of the resistors 67 is connected to the bus 68 as shown. The free end of the reed switch 66 is connected to a junction 69 between adjacent resistors 65 with the exception of the lowermost switch 66 (on the right as seen in FIG. 20) which is connected to the junction 70 between the terminal or tab 43 and the adjacent resistor 65.

The length of the network between the upper terminals 45 and 46 on the one hand and the lower terminals 43 and 44 on the other hand may be varied as desired and this is represented schematically by the dotted interruption. In order to increase the length of the network it is merely necessary to insert additional sets of the resistor and switch components that are contained within the phantom lined box 71. In the present embodiment the reed switches 66 are located at $\frac{1}{2}''$ intervals throughout the module and are used in pairs in order to obtain $\frac{1}{4}''$ resolution. Therefore, the addition of the network components 71 should take place in pairs.

If the network contains four reed switch component sets 71 at $\frac{1}{2}''$ intervals, the module will cover a level range of 2''. All of the modules of a given length are produced with identical construction so that they can be used interchangeably as the uppermost module of the probe. However, in order to avoid a voltage offset at the full end of the voltage divider it is desirable at the top of the probe to bypass the first resistor 65 that is shown in FIG. 20 connected to the terminal 45. For this purpose the module is provided with the additional conductive member or tab 58 connected to the junction 69 at the opposite end of that first resistor 65.

For the bottom module 42, the network will contain only two reed switches (this will be described further below), tab 44 will be omitted, and, since the module 42 is not intended for use in any position other than the bottom position, said module will not be provided with a tab 58.

Referring now to FIGS. 13 to 16, there is illustrated the steps in fabricating a module 41 having a 2'' range. Assembly commences with a frame or grid 75 of a suitable metal such as brass that may be either photo-etched or progressively die stamped to produce the configuration shown in FIG. 13. For purpose of identification the tabs 43 to 46 are numbered, respectively, "2", "4", "1", and "3". These same numbers are shown in FIG. 20 alongside the schematic illustration of the corresponding tabs. The grid 75 is also provided with a locating notch 76 for ensuring proper orientation of the grid when assembling components thereto. The holes or apertures 77 are provided for locating and handling the grid while apertures 78 are provided to receive preformed component parts to facilitate positioning of the parts and simplify the soldering thereof.

The next step in the production method is to form cylindrical troughs 79 in the ends of the tabs 43 and 45 and the intermediate cantilevered supports 80 which troughs are dimensioned to receive the reed switches. The resistors 65 of the module are all of identical electrical value selected as a function of the variation in probe length anticipated and the range of the measuring apparatus. All but one are configured as shown at 81. The resistor 65 intended for installation at the bottom end of the frame 75 is provided with shorter lead as shown at 82. The resistors 67 are all preformed as shown at 83 and preassembled to the glass enveloped reed swith 66 by soldering at 84. The preformed parts are then preassembled on the frame 75 as shown in FIG. 15 and suitably soldered to the frame. Thereafter the assembly is placed within a mold and encased within a molded body 41 as shown in FIG. 16. Finally, the molded module is severed from the frame 75 to yield the components as shown in FIGS. 6 to 9.

The module described with reference to FIGS. 13 to 16 contains four reed switches 66 and has a 2'' level measuring range. By providing additional modules of varying lengths related to the module 41 in a binary fashion, i.e., containing 8, 16, 32, and so forth, reed switches, it will be understood that any length probe can be assembled with a minimum number of modules varying in 1'' increments. For this purpose it should be understood that for odd inches of probe length the bottom module shown in FIGS. 10 to 12 and having a 1'' range would be included. The 1'' module would not be used for even inches of probe length. In such case it may be desirable to cut off the unneeded interlocking end structure from the bottom module.

Figure 19:
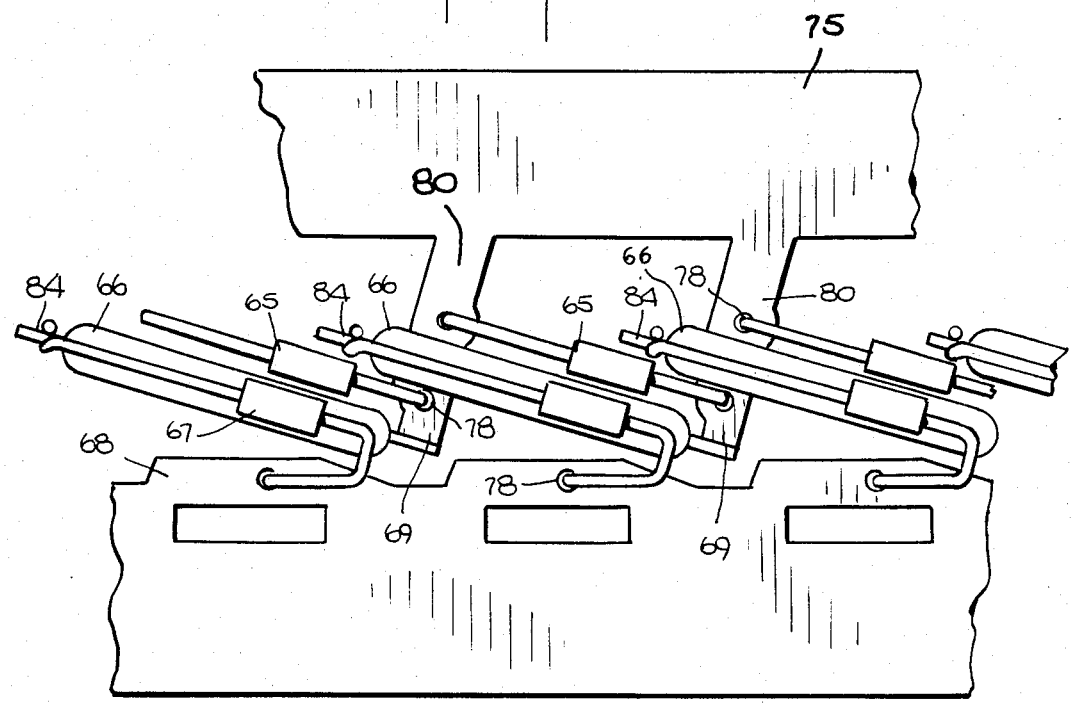
FIG. 19 is a fragmentary plan view, similar to FIG. 15, but showing the arrangement of parts for enlarging the module of FIGS. 13 to 15.

In order to increase the size of the 2" module shown with reference to FIGS. 13 to 16, additional reed switches and frame structure can be incorporated as shown in FIG. 19. The addition shown in FIG. 19 would be repeated for every inch of probe length and would be inserted within the frame shown in FIG. 14 at the location of the phantom line 85.

Figure 18:
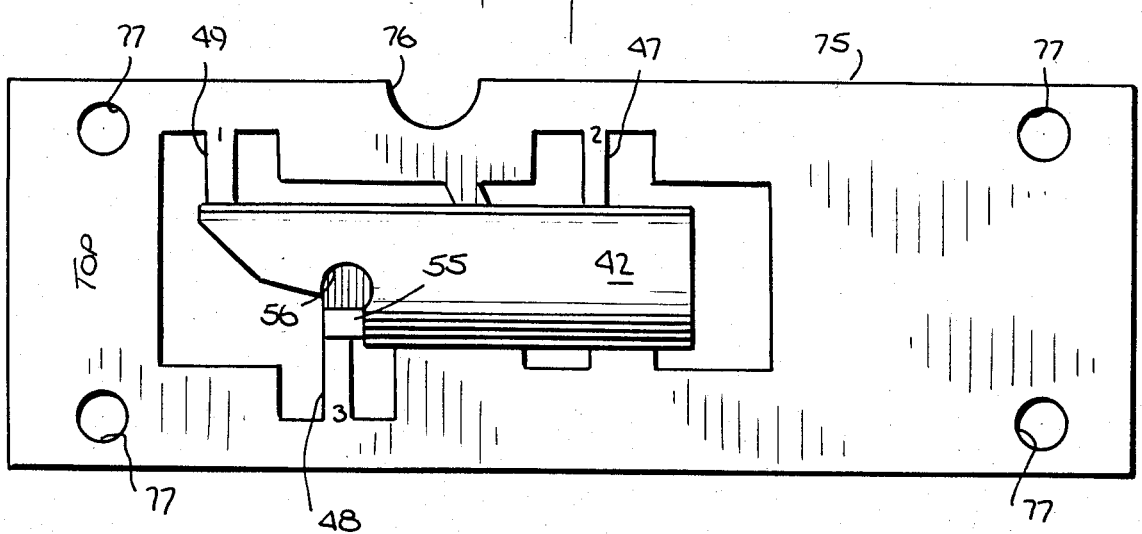

The modification necessary to produce the bottom module 42 is illustrated in FIGS. 17 and 18. The preliminary steps of frame construction before assembling the resistor and reed switch components should be apparent from a consideration of FIG. 17. The finally molded product prior to severance of the frame elements is shown in FIG. 18.

Common to all of the modules described above is a frame construction and method of mounting the reed switches that supports the switches cantilever style such that any flexure of the frame, between the time the components are attached thereto and the plastic body is molded thereabout, will not apply damaging stress to the glass encased switches. The formed tabs and supports containing the troughs 79 in the frame 75 serve the dual function of supporting the reed switches prior to molding of the body and as electrical conductors to the adjacent components. The frame is preferably tin plated to facilitate soldering. Any suitable plastic can be used to form the body provided that the material is dimension stable and susceptible of molding to reasonably close tolerances. At present, it is preferred to use either a phenolic or epoxy based resin.

The keyed interlocking complemental or male/female body-ends enable the assembly of nearly unlimited lengths of self-supporting probe structure. The molded groove 54 is intended to accommodate an insulated wire 57 of #22 AWG without an enlargement of the diameter of the structure. The keying of the module ends also prevents incorrect electrical connection of components from one module to the next.

An important aspect of the modular construction is that the end mounting of reed switches that become adjacent when the modules are assembled is such as to maintain the ½" interval throughout the entire length of the probe. Because of the modular construction, testing is facilitated prior to assembly and it is easier to isolate a defective section when trouble develops in use. As explained previously, the modules are preferably produced with $2^n$ reed switches where n is any positive number. If desired, a module can be constructed with only 1 reed switch.

Having described the presently preferred embodiments of the invention with reference to the appended drawings it should be apparent to those skilled in the subject art that numerous changes in construction can be introduced without departing from the true spirit of the invention as defined in the appended claims.

What is claimed is:

1. A magnetically responsive circuit-element module for liquid-level monitoring apparatus comprising an elongated body having ends that are complementally shaped and keyed for interlocking end-to-end assembly with other modules having the same end construction to form an assembly of any desired length, at least one float-magnet actuatable magnetic reed switch confined within said body, and electrically conductive members that are accessible from outside said body and that extend into the interior of said body where said conductive members are coupled to said reed switch for establishing electrical connection to said reed switch, said conductive members having portions located and oriented with respect to said body such that upon effecting said interlocking end-to-end assembly with other modules said conductive member portions are positioned for coupling to complemental conductive members that extend into said other modules to establish a network of reed switches connected electrically in a liquid-level sensing circuit.

2. A magnetically responsive circuit-element module according to claim 1, characterized in that said body is provided with a longitudinally extending groove for establishing with said other modules when interlocked therewith a continuous channel for accommodating an external electrical conductor.

3. A magnetically responsive circuit-element module for liquid-level monitoring apparatus comprising an elongated body having ends that are complementally shaped and keyed for interlocking end-to-end assembly with other modules having the same end construction to form an assembly of any desired length, at least one float-magnet actuatable magnetic reed switch confined within said body, and electrically conductive members that extend from outside said body into the interior thereof where said conductive members are coupled to said reed switch for establishing electrical connection to said reed switch, said conductive members having portions located and oriented with respect to said body such that upon effecting said interlocking end-to-end assembly with other modules said conductive member portions are positioned in juxtaposition with complemental conductive members that have portions extending from within said other modules to establish a network of reed switches connected electrically in a liquid-level sensing circuit.

4. A magnetically responsive circuit-element module according to claim 3, characterized in that each module has opposing ends that are dissimilarly configured such that said assembly with other modules is constrained to a predetermined module-to-module orientation.

5. A magnetically responsive circuit-element module according to claim 4, characterized in that said body is right circular cylindrical to provide a right circular cylindrical assembly of interconnected modules.

6. A magnetically responsive circuit-element module according to claim 5, characterized in that a plurality of reed switches are confined within said body uniformly spaced from one end to the other end of said body and electrically interconnected within said body and with said electrically conductive members to form a four terminal network containing a repetitive component network, and the reed switch adjacent each of said opposing ends of said body is disposed relative to its corresponding body-end for establishing with the near-end reed switch in an adjacent interlockingly assembled other module a continuing component network with the same inter-switch spacing as within said body.

7. A magnetically responsive circuit-element module according to claim 6, characterized in that said body contains a plurality of like resistor elements series-connected between one of said electrically conductive members adjacent each end of said body, and a conductive connection within said body interconnecting additional ones of said electrically conductive members adjacent each of said body-ends, each of said reed switches except one being coupled between said conductive connection and the junction between a different pair of said resistor elements, said one reed switch being coupled between said conductive connection and the junction between an end resistor element and the corresponding conductive member.

8. A magnetically responsive circuit-element module according to claim 7, characterized in that an electrically conductive terminal is provided on the exterior of said body which terminal is joined by an internal connection to the inter-resistor junction nearest one of said body-ends for bypassing an end resistor of said series-connected resistors.

9. A magnetically responsive circuit-element module according to claim 8, characterized in that said body is provided with a longitudinally extending groove for establishing with said other modules when interlocked therewith a continuous channel for accommodating an external electrical conductor.

10. A magnetically responsive circuit-element module according to claim 3, characterized in that a plurality of reed switches are confined within said body uniformly spaced from one end to the other end of said body and electrically interconnected within said body and with said electrically conductive members to form a four terminal network containing a repetitive component network, and the reed switch adjacent each end of said body is disposed relative to its corresponding body-end for establishing with the near-end reed switch in an adjacent interlockingly assembled other module a continuing component network with the same inter-switch spacing as within said body.

11. A magnetically responsive circuit-element module according to claim 10, characterized in that said body contains a plurality of like resistor elements series-connected between one of said electrically conductive members adjacent each end of said body, and a conductive connection within said body interconnecting additional ones of said electrically conductive members adjacent each of said body-ends, each of said reed switches except one being coupled between said conductive connection and the junction between a different pair of said resistor elements, said one reed switch being coupled between said conductive connection and the junction between an end resistor element and the corresponding conductive member.

12. A magnetically responsive circuit-element module according to claim 11, characterized in that an electrically conductive terminal is provided on the exterior of said body which terminal is joined by an internal connection to the inter-resistor junction nearest one of said body-ends for bypassing an end resistor of said series-connected resistors.

13. A magnetically sensitive probe for use in liquid-level monitoring apparatus wherein a float-borne magnetic source controls the status of an array of magnetically responsive switches to provide a signal indicative of liquid level, said probe comprising a plurality of individual modules joined end-to-end both mechanically and electrically to provide a continuous network of uniformly spaced magnetically responsive reed switches throughout the length of the probe, each module comprising an elongated body having opposing ends complementally shaped and keyed in interlocking end-to-end assembly with the adjacent modules, at least one float-magnet actuatable magnetic switch confined within each said body, and electrically conductive members that extend from outside each said body into the interior of the respective body where said conductive members are coupled to the respective reed switches for establishing electrical connection to the respective reed switches, said conductive members having portions located and oriented with respect to each said body where they are in juxtaposition with and electrically connected to complemental conductive members that have portions extending from within said adjacent module bodies thereby establishing a network of said reed switches connected in a liquid-level sensing array throughout the length of the probe.

14. A magnetically sensitive probe according to claim 13, characterized in that the modules in said probe are not all of the same length, and the number of said reed switches in a given module is a function of said module length.

15. A magnetically sensitive probe according to claim 14, characterized in that each module contains $2^n$ reed switches where n is any positive integer including zero.

16. A magnetically sensitive probe according to claim 15, characterized in that each module contains at least two reed switches.

17. A magnetically sensitive probe according to claim 13, characterized in that each of said module bodies contains a plurality of like resistor elements series-connected between one of said electrically conductive members adjacent each end of said body, and a conductive connection within said body interconnecting additional ones of said electrically conductive members adjacent each of said body-ends, each of said reed switches within the body except one being coupled between said conductive connection and the junction between a different pair of said resistor elements, said one reed switch being coupled between said conductive connection and the junction between an end resistor element and the corresponding conductive member, whereby as a result of said inter-module electrical connection there is provided in said probe from a bottom terminus to a top terminus a repetitive $\pi$-network with said reed switches in the legs and the resistor elements in the tops, respectively, of said $\pi$-network, and all of said resistor elements with the exception of the uppermost being connected in series between bottom and top terminals, and conductive means at the top of the probe for establishing external connection to each of said terminals and to the uppermost conductive member that is connected to said conductive connection which is continuous throughout the length of the probe.

18. A magnetically sensitive probe according to claim 17, characterized in that each of said bodies is provided with a longitudinally extending groove, all such grooves being in axial alignment establishing a continuous channel throughout the length of said probe, and said conductive means includes an electrical conductor disposed in said channel for establishing said external connection to said bottom terminal.

19. A magnetically sensitive probe according to claim 18, characterized in that each of said bodies is right circular cylindrical forming a right circular cylindrical probe of substantially uniform diameter throughout its length.

20. A magnetically sensitive probe according to claim 13, characterized in that each of said bodies is provided with a longitudinally extending groove, all such grooves being in axial alignment establishing a continuous channel throughout the length of said probe, and said conductive means includes an electrical conductor disposed in said channel for establishing said external connection to said bottom terminal.

* * * * *